United States Patent [19]
Shagam

[11] Patent Number: 6,158,042
[45] Date of Patent: *Dec. 5, 2000

[54] METHOD OF COUNTING BITS

[75] Inventor: Eli Shagam, Brookline, Mass.

[73] Assignee: EMC Corporation, Hopkinton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,327

[22] Filed: Dec. 30, 1997

[51] Int. Cl.[7] .................................................. G06F 11/00
[52] U.S. Cl. ............................................................ 714/805
[58] Field of Search ........................... 708/210; 714/805, 714/809, 811, 812

[56] References Cited

U.S. PATENT DOCUMENTS

| | | | |
|---|---|---|---|
| 4,486,848 | 12/1984 | Kaminski | 364/715 |
| 4,888,780 | 12/1989 | Imazu | 371/31 |

Primary Examiner—Stephen M. Baker
Attorney, Agent, or Firm—Fish & Richardson P.C.

[57] ABSTRACT

A method for counting the number of bits which are set to binary "1" in a word of length $2^n$ includes generating a first mask of length $2^n$ having alternating sequences of "1"'s and "0"'s, each sequence having a length "x" (the length "x" initially having a value of 1), and generating a second mask of length $2^n$ by forming the complement of the first mask. Logical AND operations using the word and each of the first and second masks are performed to generate first and second intermediate words, respectively. That one of the first and second intermediate words having been ANDed with one of the first and second masks having a "0" in its least significant bit position, is shifted "x" number of bit positions to generate a shifted intermediate word. The shifted intermediate word and the other of the first and second intermediate words are arithmetically added to generate a bit-counted word of $2^n$ length representing the number of bits in the word set to binary "1" from the bit-counted word. The value of "x" is doubled and the method is repeated $2^n$ iterations.

1 Claim, 3 Drawing Sheets

METHOD OF COUNTING BITS

BACKGROUND OF THE INVENTION

This invention relates to counting the number of bits in a word which are set to binary "1".

The software for controlling a computer system generally includes an enormous number of instructions organized in programs or smaller sets of instructions called routines. A routine which may be used in a wide variety of applications may be complex or may be a relatively simple function executed many times within a program.

The performance of the computer system can be largely dependent on the efficiency of the programs executed to control the transmission and receipt of data to and from the different parts of the system. Thus, programmers and systems analysts strive to minimize the number of instructions required to perform a function so that the overall efficiency of the computer system is improved.

SUMMARY OF THE INVENTION

This invention relates to determining the number of bits in a word which are set to binary "1". The reasons for doing so are numerous. In a very general application, determining the number of bits in a word which are set to binary "1" can be used for error-correction (e.g., parity checking). In another application, the number of bits set to binary "1" may represent a value for determining which branch of a decision tree the program should execute.

In a general aspect of the invention, a method for counting the number of bits which are set to binary "1" includes:

a) generating a first mask of length $2^n$ having alternating sequences of "1"'s and "0"'s, each sequence having a length "x", the length "x" initially having a value of 1;

b) generating a second mask of length $2^n$ by forming the complement of the first mask;

c) performing logical AND operations using the word and each of the first and second masks to generate first and second intermediate words, respectively;

d) shifting "x" number of bit positions that one of the first and second intermediate words which has been ANDed with one of the first and second masks and having a "0" in its least significant bit position to generate a shifted intermediate word;

e) arithmetically adding the shifted intermediate word and the other of the first and second intermediate words to generate a bit-counted word of length $2^n$ representing the number of bits in the word set to binary "1" from the bit-counted word;

f) generating a new value "y" which is equal to doubling the value of "x"; and g) repeating steps a) through f) if "y" does not equal $2^n$, with "x" set to a new value equal to "y".

In another aspect, the invention is a computer-readable medium for storing a computer program, executable on a computer having a memory, for counting the number of bits which are set to binary "1" in a word of length $2^n$. The stored program includes:

a) computer-readable instructions which generate a first mask of length $2^n$ having alternating sequences of "1"'s and "0"'s, each sequence having a length "x", the length "x" initially having a value of 1;

b) computer-readable instructions which generate a second mask of length $2^n$ by forming the complement of the first mask;

c) computer-readable instructions which perform logical AND operations using the word and each of the first and second masks to generate first and second intermediate words, respectively;

d) computer-readable instructions which shift, "x" number of bit positions, that one of the first and second intermediate words which has been ANDed with one of the first and second masks and having a "0" in its least significant bit position to generate a shifted intermediate word;

e) computer-readable instructions which arithmetically add the shifted intermediate word and the other of the first and second intermediate words to generate a bit-counted word of length $2^n$ representing the number of bits in the word set to binary "1" from the bit-counted word;

f) computer-readable instructions which generate a new value "y" which is equal to doubling the value of "x"; and g) computer-readable instructions which repeat steps a) through f) if "y" does not equal $2^n$, with "x" set to a new value equal to "y".

A computer-readable medium includes any of a wide variety of memory media such as RAM or ROM, as well as, external computer-readable media, for example, a computer disk or CD ROM. A computer program can also be downloaded into a computer's temporary active storage (e.g., RAM, output buffers) over a network. For example, the above-described computer program can be downloaded from a Web site over the Internet into a computer's memory. Thus, the computer-readable medium of the invention is intended to include the computer's memory which stores the above-described computer program that is downloaded from a network.

In another aspect, the invention features a disk drive controller system which receives and transmits a data stream and utilizes the method described above.

Advantages of these aspects of the invention are numerous. In general, the number of instructions required to determine the number of bits in a word which have been set to binary "1" is significantly reduced. More specifically, using the method and apparatus described above, the computational complexity is of $\log_2(n)$ order. This provides a substantial improvement over conventional approaches in which determining the number of bits in a word set to "1" requires individually checking each bit of the word. For example, a 32 bit word only requires an iterative routine of the invention to be executed 5 (i.e., $\log_2 32$) times, rather than 32 times.

Other features of the invention will be apparent from the following description of the preferred embodiments and from the claims.

DESCRIPTION

Figure 1:
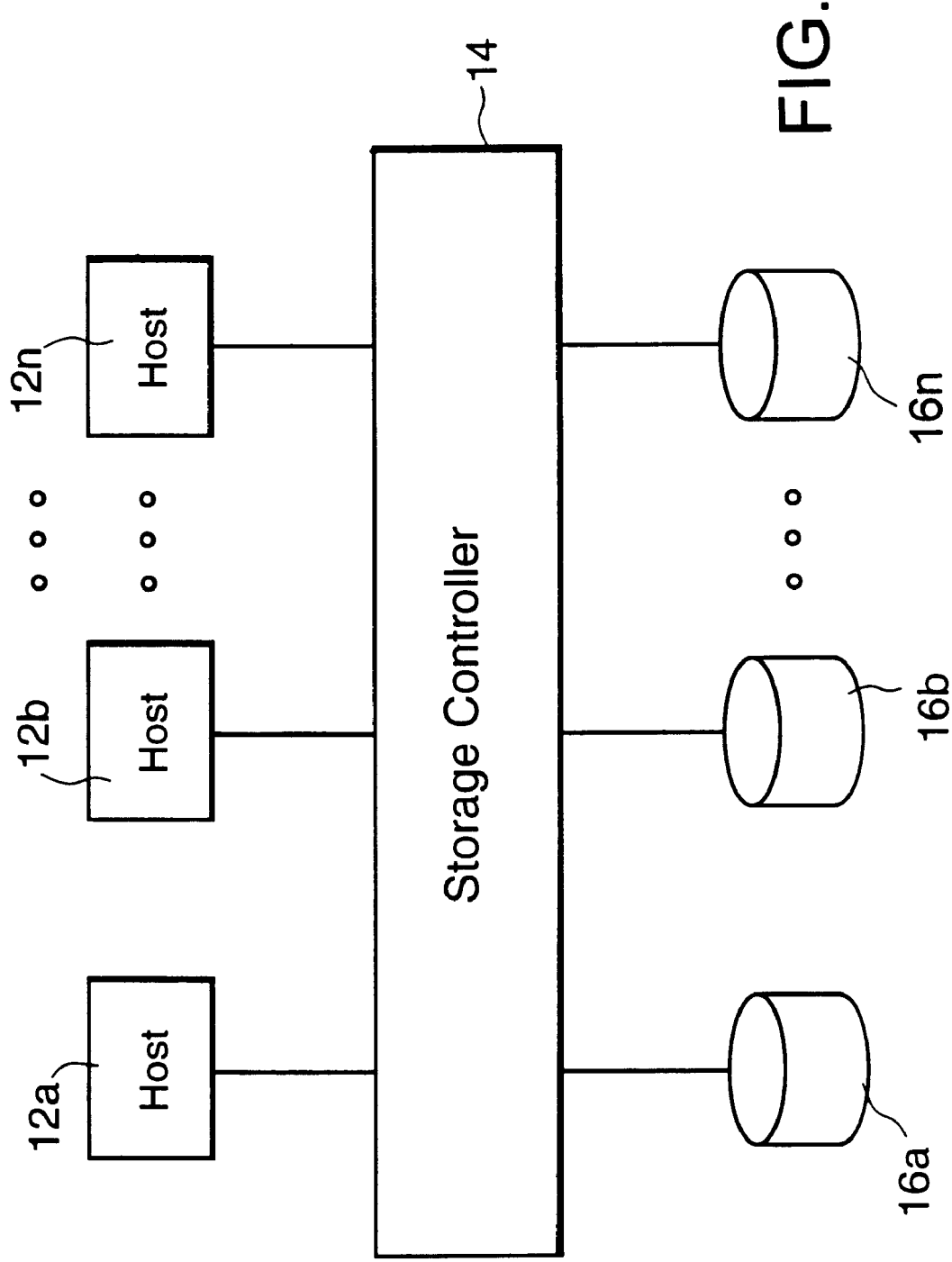
FIG. 1 is a block diagram illustrating a disk storage element/host computer system for which the invention is particularly useful.

Referring to FIG. 1, the invention has particular application in computer systems having at least one, and more likely a number of host computers or processors 12*a*, 12*b*, . . . , 12*n*, connected to a storage controller system 14, such as the EMC Symmetrix® storage system, a product of EMC Corporation, Hopkinton, Mass. Storage controller 14 acts as the interface between the host computers and a plurality of mass storage devices, such as, for example, disk drive elements 16a, 16b, . . . , 16n. Data written by the host or read from the disk drive elements passes through the storage controller system which provides a bi-directional communications path with additional substantial capabilities. For example, in some systems, the data from the host is uniformly striped across all of the disk storage devices; and in other systems, the data from the host is stored on the disk drives 16 according to a RAID protocol or an n-way mirrored protocol. In yet other embodiments of the invention, all of the data from a particular host can be stored in a logical volume on a single disk drive or allocated to different logical volumes of the same or different disk drives, depending upon the nature and the source of the data and host. A host computer can also read data from one or more of the disk drive units to generate a host logical volume.

In a disk drive controller system of the type shown in FIG. 1, determining the distribution of data and copying and replacing (i.e., "copy and swap") data on the different memory elements can be performed. In performing these processes, as well as numerous other processes, it may be necessary to determine the number of bits in a word which have been set to binary "1".

Figure 2:
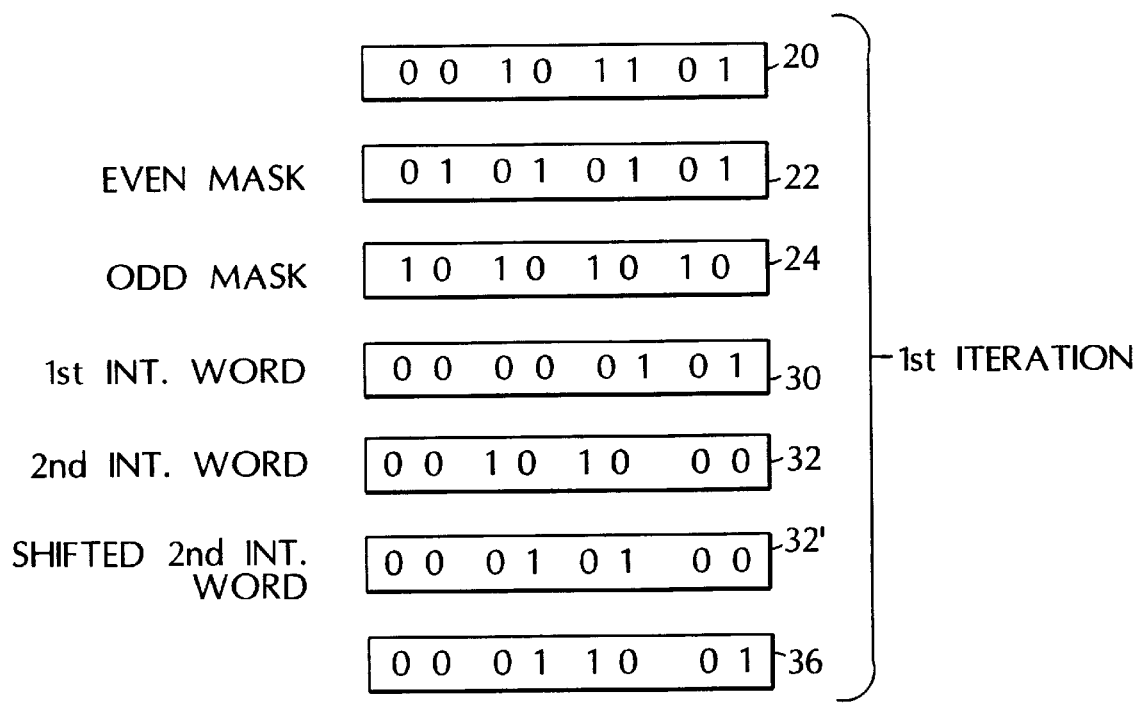
FIG. 2 illustrates a data object representation of a first iteration of the process of the invention.
Figure 3:
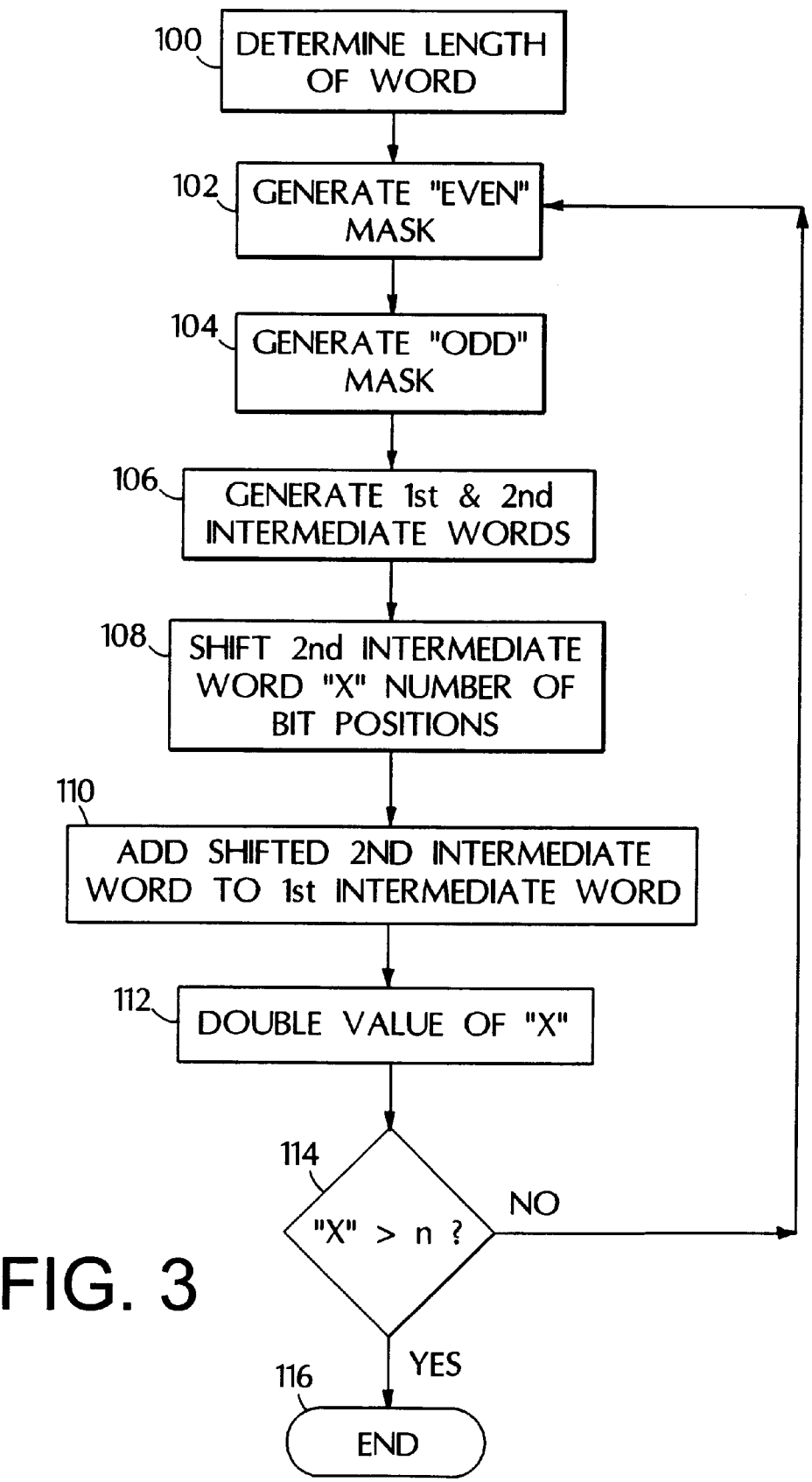
FIG. 3 is a flow diagram illustrating operation of the invention.

With reference to FIG. 2 and the flow diagram shown in FIG. 3, an example of the process used to determine the number of bits in a word which have been set to binary "1" is described.

Assume that an 8 bit word is as follows:

00 10 11 01

This word can be stored in an 8-bit buffer or register 20. One can easily see that of the 8 bits, 4 have been set to binary "1". For a computer to determine this is not nearly as trivial. The length of the word, here 8, is first determined (step 100). On this basis, the computational complexity of the process is known to be 3 ($\log_2=3$). Thus, three iterations are required for determining the number of bits set to binary "1" in this word.

In general, within each iteration, an even mask 22 and an odd mask 24 are generated (steps 102 and 104, respectively). The even and odd masks are simply complements of each other. Each mask has alternating sequences set to binary "1", with the length of the sequence dependent upon the particular level of iteration. More specifically, during the first level of iteration, the alternating sequences are simply one bit long and thereafter, the length of the sequence is doubled. Thus, second, third, and fourth iterations have alternating sequences which are 2, 4, and 8 bits long, respectively.

The word being tested is then logically ANDed with each of the even and odd masks to generate first and second intermediate words (step 106) which can be stored in registers 30, 32, (FIG. 2) respectively. That one of the first and second intermediate words which has been ANDed with one of the first and second masks having a "0" in its least significant bit position is shifted a number of bits depending on the particular level of iteration (step 108). Thus, similar to the approach used to generate the masks, during the first level of iteration, the intermediate word is shifted one bit position to the right and thereafter the number of "bits shifted" is repeatedly doubled. Thus, second, third, and fourth iterations would require shifting 2, 4, and 8 bit positions, respectively. The shifted intermediate word could be stored in its respective register, for example 32'.

The shifted intermediate word 32' is arithmetically added to the non-shifted intermediate word (that is registers 30 and 32' are arithmetically added at the first level) to generate a bit-counted word 36 representative of the number of bits in the word set to binary "1" (step 110). The bit-counted word can be stored in a register 36.

A summary of this first iteration is shown below:

| word | a | 00 | 10 | 11 | 01 |
|---|---|---|---|---|---|
| Even_mask | b | 01 | 01 | 01 | 01 |
| Odd_mask | c | 10 | 10 | 10 | 10 |
| a & b | d | 00 | 00 | 01 | 01 |
| a & c | e | 00 | 10 | 10 | 00 |
| e >> 1 | f | 00 | 01 | 01 | 00 |
| d + f | g | 00 | 01 | 10 | 01 |
| number of bits | | 0 | 1 | 2 | 1 = 4 (decimal) |

Note that each pair of bits in the bit counted word (row g) represents a binary number, the sum number of bits set to binary "1" within the word.

Because, in this example, the word is $2^3$ bits long, two additional iterations are required to arrive at a count, in a single binary word, identifying the final number of bits set to binary "1". Thus, an index used to generate the even and odd masks as well as the number of bit position shifts is doubled (step 112) and a determination is made as to whether the final iteration has been performed (step 114). If so, the process is terminated (step 116). In the second iteration, new even and odd masks are generated. Using the steps described above, the second iteration would be summarized as follows:

| Bit counted word from 1st iteration: | g | 0001 | 1001 |
|---|---|---|---|
| Mask for even pairs | h | 0011 | 0011 |
| Mask of odd pairs | i | 1100 | 1100 |
| g & h | j | 0001 | 0001 |
| g & i | k | 0000 | 1000 |
| k >> 2 | l | 0000 | 0010 |
| j + l | m | 0001 | 0011 |
| number of bits | | 1 | 3 = 4 (decimal) |

Note here that the even and odd masks have alternating sequences 2 bits long and that intermediate word (row k) is shifted 2 bits. It is also important to note that the new bit counted word (row m) once again represents a binary number, the sum of bits set to binary "1" within the word.

The third and final iteration is performed in similar manner as summarized immediately below:

| Bit counted word from 2nd iteration: | m | 00010011 |
|---|---|---|
| Mask for even pairs | n | 00001111 |
| Mask for odd pairs | o | 11110000 |
| m & n | p | 00000011 |
| m & o | q | 00010000 |
| q >> 4 | r | 00000001 |
| p + s | s | 00000100 |
| number of bits: | | 4 (decimal) |

Consistent with the above description, in this final iteration, the even and odd masks have alternating sequences 4 bits long and the intermediate word (row q) is shifted to the right 4 bits. Note that the final bit counted word (row s) provides the binary value of the number of bits set to binary "1" within the word.

Attached as an Appendix is assembly source code for one implementation of a method for determining the number of bits set to binary "1". The approach has a computational complexity of order "n" and is suitable for examining any word of a length $2^n$.

Other embodiments are within the following claims.

What is claimed is:

1. A method of controlling a plurality of memory elements of a mass storage system, the method comprising determining the distribution of data and copying and replacing the data on the memory elements with a copy and swap operation, said copy and swap operation including counting the number of bits which are set to binary "1" in a word of length $2^n$, and counting the number of bits includes the following steps:

a) reading the word from the data stream;

b) generating a first mask of length $2^n$ having alternating sequences of "1"'s and "0"'s, each sequence having a length "x", the length "x" initially having a value of 1;

c) generating a second mask of length $2^n$ by forming the complement of the first mask;

d) performing logical AND operations using the word and each of the first and second masks to generate first and second intermediate words, respectively;

e) shifting "x" number of bit positions that one of the first and second intermediate words which has been ANDed with one of the first and second masks and having a "0" in its least significant bit position, to generate a shifted intermediate word;

f) arithmetically adding the shifted intermediate word and the other of the first and second intermediate words to generate a bit-counted word of length $2^n$ representing the number of bits in the word set to binary "1" from the bit-counted word;

g) generating a new value "y" which is equal to doubling the value of "x"; and h) repeating steps b) through g) if "y" does not equal $2^n$, with "x" set to a new value equal to "y".

* * * * *